Nov. 11, 1969        I. H. CULVER        3,477,249
CONSTANT VELOCITY UNIVERSAL JOINT
Filed July 8, 1968        4 Sheets-Sheet 1
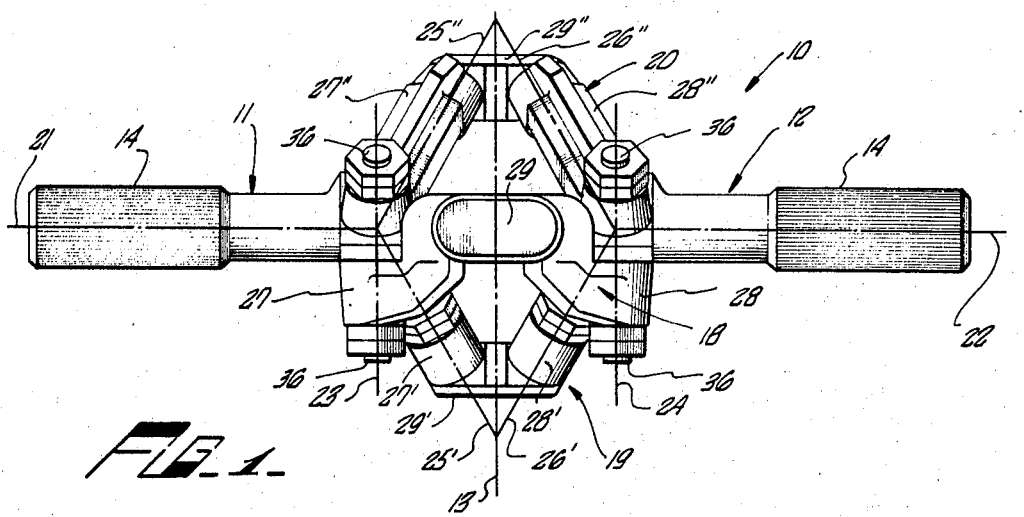
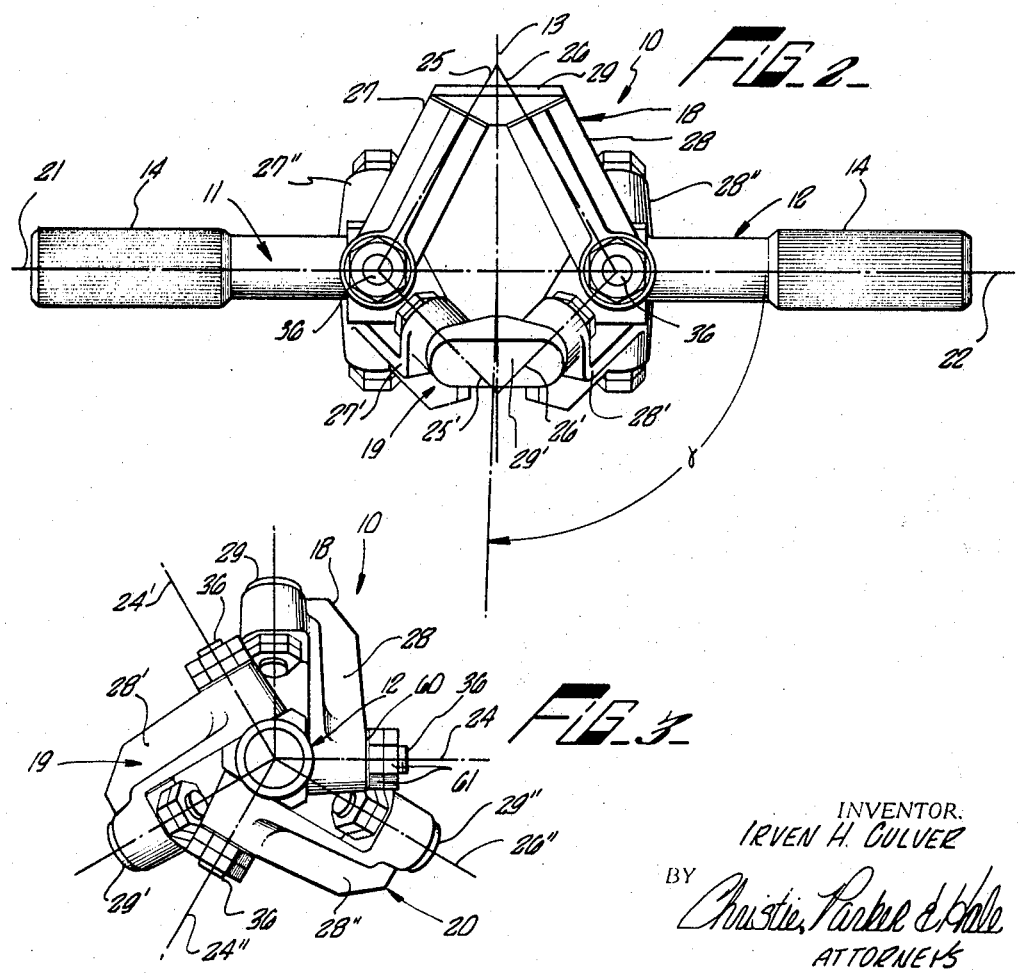
INVENTOR.
IRVEN H. CULVER
BY
Christie, Parker & Hale
ATTORNEYS

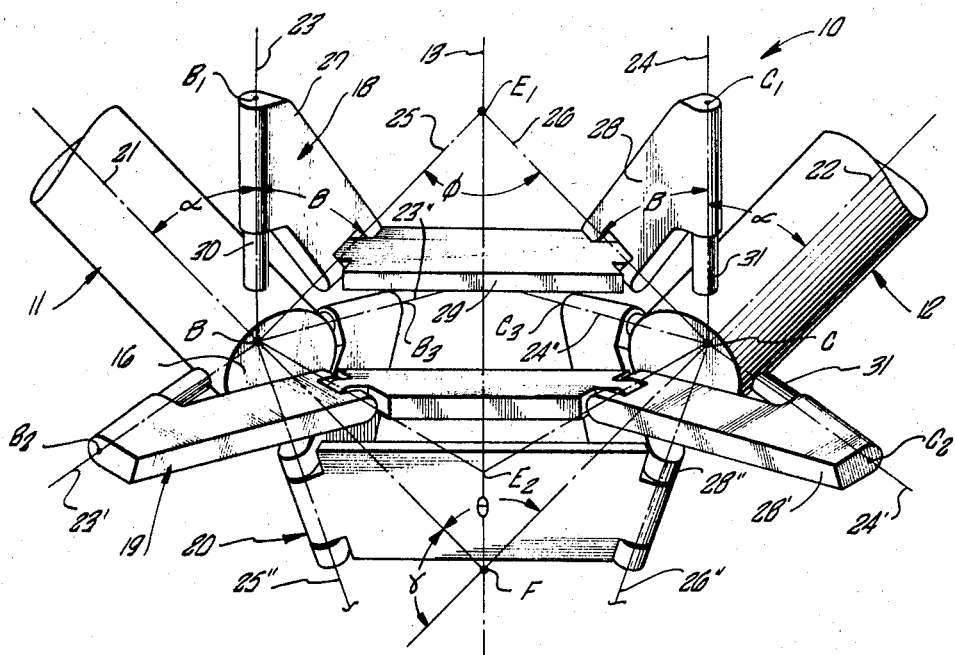
FIG._4_
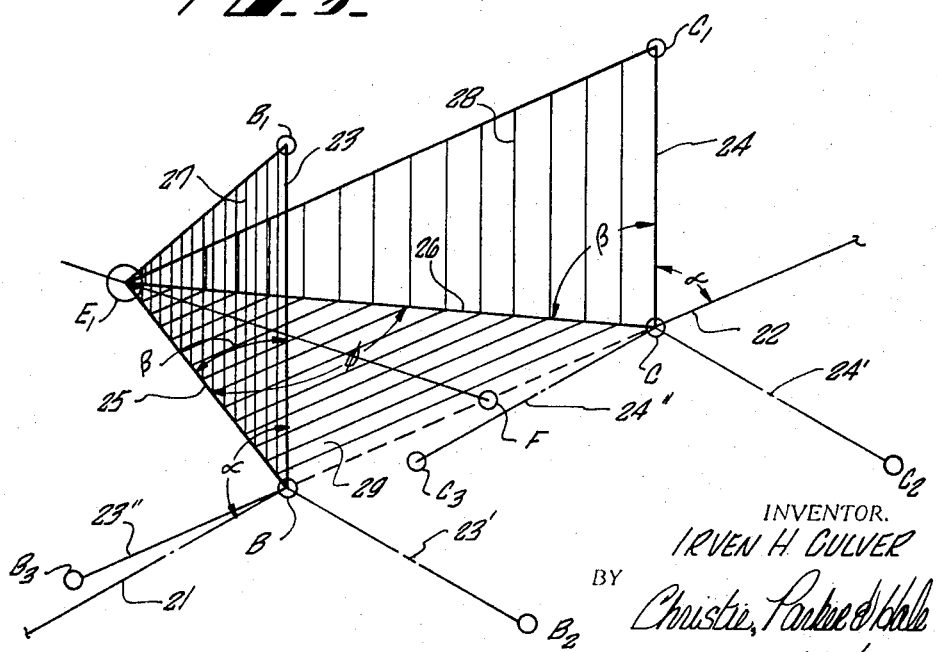
FIG._5_
INVENTOR.
IRVEN H. CULVER
BY
Christie, Parker & Hale
ATTORNEYS INVENTOR.
IRVEN H. CULVER
BY
Christie, Parker & Hale
ATTORNEYS

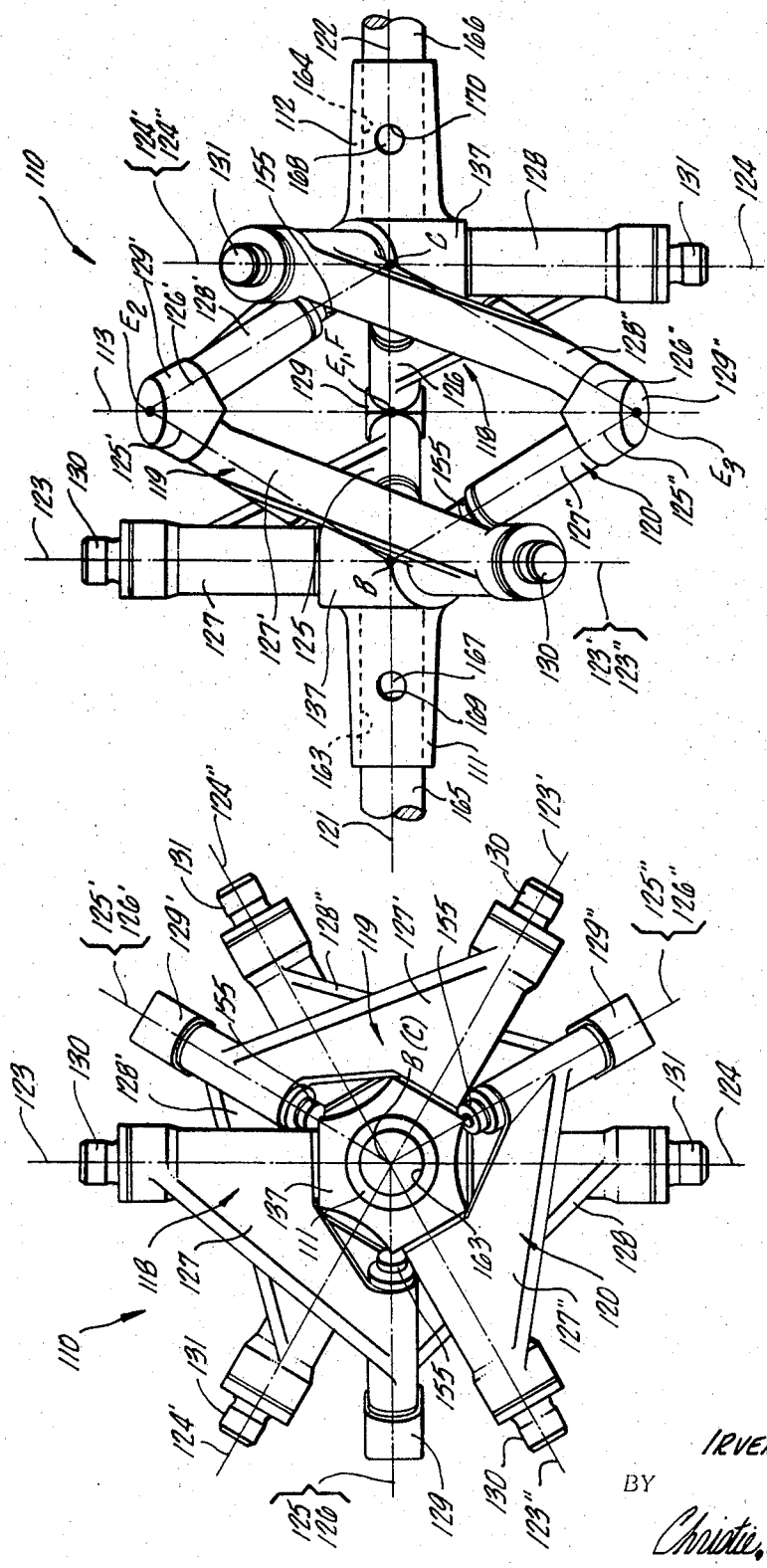

United States Patent Office
3,477,249
Patented Nov. 11, 1969

3,477,249
CONSTANT VELOCITY UNIVERSAL JOINT
Irven H. Culver, Playa Del Rey, Calif., assignor to Southwestern Industries, Inc., Los Angeles, Calif., a corporation of California
Continuation-in-part of application Ser. No. 665,507, Sept. 5, 1967. This application July 8, 1968, Ser. No. 743,132
Int. Cl. F16d 3/30, 3/54
U.S. Cl. 64—21      12 Claims

ABSTRACT OF THE DISCLOSURE

A constant velocity universal joint capable of accommodating angular misalignments of input and output shafts through the range of from 0° to 90°. The joint includes at least three linkage systems connected between the input and output shafts, each system including four hinge axes and three link members. The hinge axes in each system preferably are arranged so that each axis intersects one other hinge axis, the two axes closest to one shaft intersecting the shaft axis at the geometric end of the shaft; the system is symmetrical about a plane which is the perpendicular bisector of a line between the geometric ends of the shaft. Each link member is hingably coupled between each intersecting set of hinge axes.

CROSS-REFERENCE TO RELATED APPLICATION

This application is a continuation-in-part of copending application Ser. No. 665,507 filed Sept. 5, 1967, which was abandoned effective upon the filing of this application.

FIELD OF THE INVENTION

This invention relates to constant velocity universal joints. More particularly, it relates to a constant velocity universal joint in which the angle between the axes of input and output shafts of the joint may be any angle between 0° (in which case the input and output shafts are axially aligned) and up to approximately 90°.

BACKGROUND OF THE INVENTION

Description of the prior art

Existing constant velocity universal joints can accommodate only about 20° angular misalignment between the joint input and output shafts and still provide reasonably good linearity of transmitted motion; a constant velocity universal joint has 100 percent linearity of transmitted motion when a predetermined point on the output shaft of the joint maintains the same angular relation to a second predetermined point on the joint input shaft through one full rotation of the input shaft. Moreover, existing constant velocity universal joints, particularly those which accommodate high angular shaft misalignments, are complicated, expensive, and cumbersome devices which must be carefully and frequently serviced in order that the desired linearity be maintained. Because of the complicated structural arrangements involved in many existing constant velocity universal joints, such joints have limited torque transmission capability in proportion to their size.

SUMMARY OF THE INVENTION

This invention provides a novel, efficient, effective, and compact constant velocity universal joint capable of accommodating angular misalignments between the joint input and output shafts through a range of from 0° to over 90°; the joint has 100 percent linearity of motion throughout this range. The joint is capable of transmitting large amounts of torque in proportion to its physical size. The construction of the joint is simple and the mechanism of the joint is easily maintained and serviced. Accordingly, the present joint is susceptible of use in environments and applications in which prior constant velocity universal joints could be used only with difficulty. Because of the high degree of shaft misalignment accommodated by the joint, a single joint can be used in instances requiring the use of two or more prior joints.

Generally speaking this invention provides a very high angularity, constant velocity universal joint for coupling together adjacent ends of rotatable drive and driven shafts. An imaginary reference point is located along the axis of each shaft. At least three linkage systems are provided for interconnecting the drive and driven shafts. Each linkage system, in terms of its geometry, includes two first hinge axes, two central hinge axes, and three rigid links. Each of the first hinge axes intersects the axis of a corresponding shaft at the reference point of the shaft and is fixed relative to the corresponding shaft axis. Each of the two central hinge axes intersects a corresponding first hinge axis at the corresponding reference point at a predetermined angle. The central hinge axes have a predetermined relation to each other. The system is geometrically symmetrical about an imaginary plane disposed midway between the reference points normal to a line between the reference points. The three rigid links are hingably connected one between each intersecting set of first and central hinge axes to define the predetermined angle and one between the two central axes for maintaining the predetermined relation. The joint also includes means at each end of the systems adapted for securing the systems between the shafts so that the first hinge axes are fixed relative to the corresponding shaft axes.

DESCRIPTION OF THE DRAWINGS

The above-mentioned and other features of the invention are more fully set forth in the following detailed description of a presently preferred embodiment of the invention, which description is presented with reference to the accompanying drawings, wherein:

FIG. 1 is a top plan view of the joint;
FIG. 2 is a side elevation view of the joint;
FIG. 3 is an end elevation view of the joint;
FIG. 4 is a mechanically simplified perspective view of the joint and is intentionally somewhat distorted to illustrate certain significant geometrical relationships existing in the joint;
FIG. 5 is a geometrical schematic diagram of one of the linkage systems of the joint;
FIG. 9 is an end view of another joint according to this invention;
and
FIG. 10 is a side elevation view of the joint shown in FIG. 9.

DESCRIPTION OF THE PREFERRED EMBODIMENT

Figure 7:
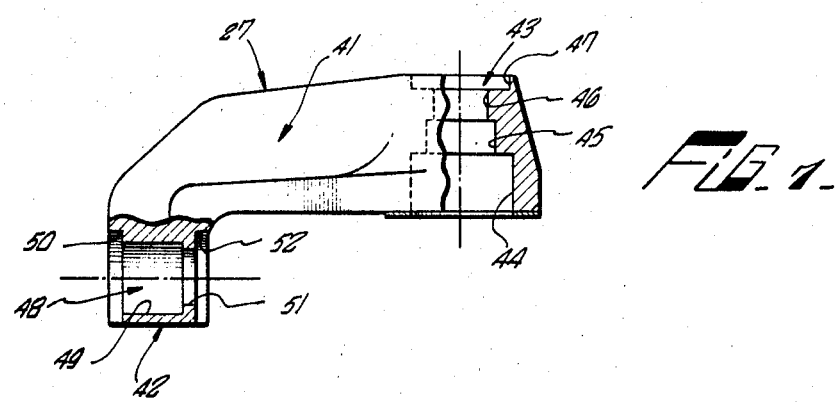
FIG. 7 is an elevation view of an end link of the joint.

A constant velocity universal joint 10 according to this invention (see FIGS. 1, 2, and 3) includes an input shaft 11 and an output shaft 12; it should be understood that since the joint is symmetrical about a center plane of symmetry 13, either of shafts 11 or 12 can be used as the input shaft and the other can be used as the output shaft. The opposite ends of the input and output shafts define identical external splines 14 by which the joint may be coupled between two additional shafts or the like (not shown). The splines serve to secure the shafts from angular movement relative to whatever structural elements they may be connected.

Shafts 11 and 12 have adjacent ends 16 and 17, respectively (see FIG. 4), which are interconnected in joint 10 by three geometrically substantially identical linkage systems 18, 19 and 20.

Since the geometric characteristics of the elements of the linkage systems are more significant to the practice of this invention than the structural arrangement of the linkage systems, FIGS. 4 and 5 are referred to for an explanation of the geometry of the joint before a description of the structural characteristics of the joint components is presented. The perspective illustration of FIG. 4 is mechanically simplified and intentionally distored so that the geometric characteristics of the joint may be illustrated with clarity.

Input shaft 11 has an axis of rotation 21 along which lies point B, referred to herein as the geometric end of the input shaft. Similarly, output shaft 12 has an axis of rotation 22 along which lies point C, the geometric end of shaft 12.

Each linkage system in universal joint 10 includes two first hinge axes 23 and 24, and two central (second) hinge axes 25 and 26. As noted above, the elements of each linkage system are essentially identical. Accordingly, unprimed reference numerals are used with respect to linkage system 18, singly primed reference numerals are used with regard to linkage system 19, and doubly primed reference numerals are used to identify features of system 20. Each linkage system also includes two terminal link members 27, 28 and a central link member 29. Points $B_1$, $B_2$ and $B_3$ lie along first hinge axes 23, 23' and 23", respectively. Points $C_1$, $C_2$ and $C_3$ lie along first hinge axes 24, 24' and 24", respectively.

With reference to linkage system 18 as illustrated in FIGS. 4 and 5, first hinge axis 23 lies at some angle $\alpha$ to input shaft axis 21, is fixed relative to axis 21, and intersects the shaft axis at the geometric end of the shaft, that is, at point B. In the presently preferred embodiment of the invention illustrated in FIGS. 1–3, the value of angle $\alpha$ is 90°; it should be understood that this angle can have any value consistent with the relationship set forth below. Similarly, hinge axis 24 intersects output shaft axis 22 at the geometric end of shaft 12, that is, at point C, and makes the same fixed angle $\alpha$ with the output shaft axis as is made at the other end of the linkage system. Second hinge axis 25 intersects first hinge axis 23 at some angle $\beta$ at reference point B, i.e., the geometric end of the input shaft. To maintain symmetry in the linkage system, axis 26 intersects axis 24 at point C and the included angle between these intersecting axes is also angle $\beta$. Second hinge axes 25 and 26 intersect each other at point $E_1$ which is spaced from a line between points B and C. The included angle between the second hinge axes at point $E_1$ is angle $\Phi$ which can have either a positive (as shown in FIG. 5) or a negative value. Identical geometrical relationships exist with respect to the first and second hinge axes in linkage systems 19 and 20.

Points $E_1$, $E_2$ and $E_3$, associated with linkage systems 18, 19 an 20, respectively, define the plane of geometrical symmetry 13 of the universal joint. This plane is midway between the geometric ends of shafts 11 and 12 and is normal to a line interconecting the geometric ends of the shafts. Regardless of the value of angle $\theta$, the supplement of angle $\gamma$ which defines the angularity (angle of misalignment of shafts 11 and 12) of the universal joint, the axes of shafts 11 and 12 intersect at point F in plane of symmetry 13.

Still referring to linkage system 18 as depicted in FIGS. 4 and 5, each of link members 27, 28, and 29 is hingably connected between a corresponding intersecting pair of the hinge axes of the system, and each link member defines and holds the predetermined relation between the axes interconnected by it. Link member 27 is hinged about axis 23 at one end of the link and about axis 25 at its other end; the geometry of link member 27 fixes the value of angle $\beta$ between axes 23 and 25 so that hinge axis 25 always intersects hinge axis 23 at the geometric end of shaft 11. In terms of geometry, i.e., in terms of its relation to the points and axes illustrated in FIG. 4, link member 28 is identical to link member 27 and is disposed for hingable rotation between hinge axes 24 and 26. Link member 29 is disposed for hingable movement between second hinge axes 25 and 26 and fixes these axes relative to each other so that, in the arrangement above, they always intersect at point $E_1$ and define included angle $\Phi$.

In structural terms, first hinge axes 23, 23' and 23" are defined by axles 30 which are fixed to shaft 11 adjacent shaft end 16. Similarly, hinge axes 24, 24' and 24" are defined by axles 31 fixed to shaft 12 adjacent shaft end 17.

In joint 10 not only is each linkage system symmetrical about plane 13, the linkage systems are also symmetrically connected between shafts 11 and 12. That is, in a plane normal to input shaft axis 21, hinge axes 23, 23' and 23" are spaced 120° apart from each other and intersect the shaft axis. Similarly, in a plane normal to output shaft axis 22, hinge axes 24, 24' and 24" are spaced 120° apart from each other and intersect each other at the shaft axis.

The maximum practical value of angle $\gamma$ is limited by mechanical interferences between the elements of the linkage systems at high values of the angle. In the presently preferred universal joint illustrated in FIG. 1, angle $\gamma$ may obtain a value of approximately 92° before mechanical interference between the elements of the linkage system occurs; at lower values of angle $\gamma$, no such interference exists. It is apparent, therefore, that universal joint 10 accommodates heretofore unheard-of amounts of angularity between the shafts coupled together by the joint.

When angle $\gamma$ has a value of zero, shafts 11 and 12 are coaxial with each other and no relative movement occurs between the elements of each of the linkage systems as the shaft rotates. When angle $\gamma$ has some finite value between zero and its operational maximum, the link members in each linkage system move angularly relative to each other about their respective hinge axes as the shafts experience one full rotation. Link member 27, for example, always lies effectively in plane $BB_1E_1$ (see FIG. 5), link member 28 always lies effectively in plane $CC_1E_1$ and link member 29 always lies effectively in plane $BB_1C$. The angles of intersection between these planes may vary through one full rotation of shafts 11 and 12, but the angles between the hinge axes defining such planes do not vary since link members 27, 28 and 29 are rigid.

From FIGS. 4 and 5 and from the foregoing description, it is apparent that the joint structure will transmit only torque between shafts 11 and 12 provided that the shafts are mounted so that the axes of rotation thereof intersect in plane of symmetry 13. Such torque is transmitted through points $E_1$, $E_2$ and $E_3$ as shear forces. Since, in the preferred joint illustrated in FIGS. 1, 2 and 3, points $E_1$, $E_2$ and $E_3$ lie outside the structure of the linkage systems, these shear forces are transmitted through link members 29. FIG. 4 further illustrates that the point of intersection of the axes of shafts 11 and 12 will always lie in plane of symmetry 13 since shear points $E_1$, $E_2$ and $E_3$ establish a plane which is in fact the plane of symmetry. Those familiar with the principles of space geometry will understand that, as to each linkage system, symmetry of geometry dictates the symmetry of motion, i.e., equal angular velocities of the input and output shafts, regardless of the angle which exists between shafts 11 and 12, so long as there is no mechanical interference within or between the linkage systems themselves.

Figure 6:
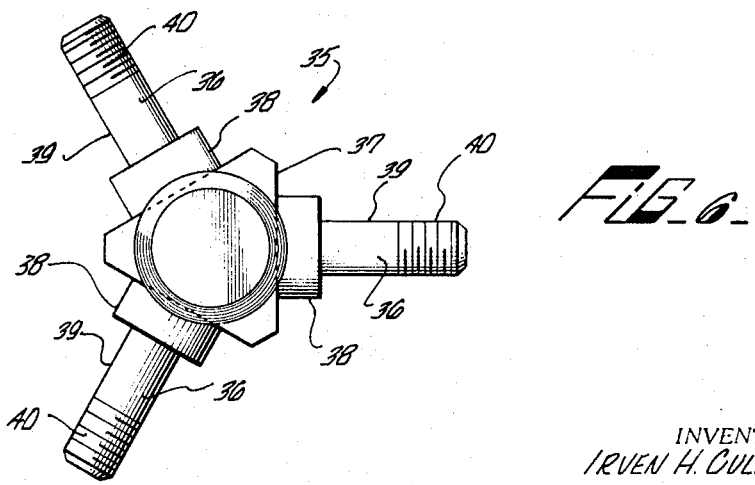
FIG. 6 is an end elevation view of a shaft hub for the joint.

FIG. 6 is an elevation view of a hub assembly 35 which is carried by each of shafts 11 and 12 at the end thereof to which is connected the linkage assemblies of the universal joint. Since the universal joint is symmetrical about plane 13, axles 36 defined by the hub assemblies correspond to and actually are axles 30 and 31 referred to in the description of FIG. 4. The hub assembly includes a central hub portion 37 which is formed integral with the corresponding one of shafts 11 and 12. It should be understood, however, that the hub portion of the hub assembly could be provided separate from the joint input and output shafts (see FIGS. 9 and 10) and could be threaded, pinned, keyed, or splined, for example, to such shafts if desired. Three axles extend radially from the hub portion and are disposed 120° apart from each other. Each axle includes an enlarged diameter portion 38 adjacent the hub portion, and a reduced diameter portion 39 having an externally threaded section 40 remote from the hub portion of the assembly. The axles of the hub assembly, as secured to shaft 11, define first hinge axes 23, 23' and 23", and the axles of the hub assembly, as secured to shaft 12, define first hinge axes 24, 24' and 24".

FIG. 7 is an elevation view, with parts broken away, of an end link member 27 which is identical to and is actually used as link member 28 in the joint depicted in FIGS. 1, 2, and 3. The link member is of L-shape configuration and has a major leg 41 and a minor leg 42. The end of leg 41 opposite from leg 42 defines a bore 43 having an enlarged diameter portion 44 at the end thereof open toward leg 42, an intermediate diameter portion 45 between the ends of the bore, and a reduced diameter portion 46 opening to a washer recess 47 at the end of the bore opposite from leg 42. The axis of bore 43 is perpendicular to and intersects the axis of a bore 48 which is formed through leg 42 of the link. Bore 48 has an enlarged diameter portion 49 which opens at its end opposite from bore 43 to a washer recess 50. The other end of bore portion 48 communicates with a reduced diameter bore portion 51 which, in turn, opens to a washer recess 52. Since bores 43 and 48 are perpendicular to each other, these link members fix the value of angle $\beta$ at 90° in joint 10.

Figure 8:
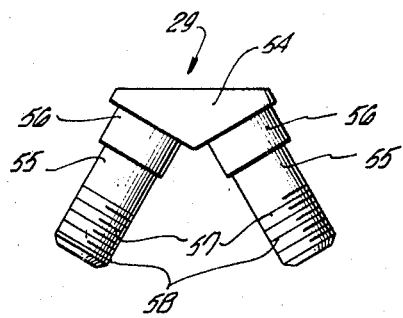
FIG. 8 is an elevation view of a central link of the joint.

FIG. 8 is an elevation view of a central link 29 of universal joint 10. The link has a central body portion 54 from one side of which and adjacent each end of which extend two stub axles 55. The stub axles lie at an angle to each other corresponding to angle $\phi$ which, in joint 10, has a value of 55°. Each stub axle has an enlarged diameter portion 56 adjacent the body portion, and a reduced diameter portion having an externally threaded section 58 opposite from the body portion. The stub axles define central hinge axes 25, 25', 25", 26, 26' and 26" illustrated in FIG. 4.

In an assembled universal joint, each shaft-mounted axle 36 is engaged within bore 43 of a corresponding link member 27 so that portions 38 and 39 of the axle are disposed in portions 44 and 46, respectively, of bore 43. Each link member is secured to the adjacent hub assembly by a washer 60 and two jam nuts 61 (see FIG. 3) engaged with the threaded section of the axle. Each end link member is therefore hingably mounted to a corresponding axle 36 for movement only in a rotatable manner about the axle and cannot move any significant amount along the axle.

Each link member 29 is engaged between a pair of end link members by inserting stub axles 55 into bores 48, after first disposing a washer in recess 50 so that stub axle portions 56 and 57 are disposed in portions 49 and 51, respectively, of bores 48. The stub axles are secured in the bores by engaging a washer in recess 52 and threading a pair of jam nuts onto the threaded ends of the stub axles. In this manner, the end link members are connected to the central link member so that the link members are movable relative to each other only in hingable fashion about the axes of the stub axles and cannot move any significant amount along the stub axles.

Referring again to FIGS. 4 and 5, certain conditions must be met in the geometry and structure of a universal joint according to this invention in order that the joint have constant velocity characteristics. As noted below, an operable joint can be provided having only one linkage system in accord with the foregoing description. Therefore, the required conditions which must be met in any operable joint according to the invention are set forth in terms of linkage system 18. Shaft axes 21 and 22 must intersect at a fixed point; they cannot be skew to each other. First hinge axis 23 must be nonparallel to and must intersect input shaft axis 21, and similarly with hinge axis 24 relative to axis 22 of the output shaft; if axes 21 and 23, and 22 and 24 are skew to each other, harmonic variations in transmitted motion result. The angle made by first hinge axis 23 relative to the input shaft axis must be equal to the angle made by first hinge axis 24 relative to the axis of the output shaft. The angles made between hinge axes 23 and 25 and between axes 24 and 26 must be equal. Moreover, the first and second hinge axes associated with the input shaft must intersect each other at a common point along the axis of rotation of the input shaft, and similarly with the hinge axes associated with the output shaft relative to the axis of the output shaft. The first hinge axes must be fixed relative to the axes of the shafts with which such hinge axes are associated. Each pair of second hinge axes must be fixed relative to each other. The element which interconnects axes 25 and 26 must be rigid and must be hingably connected about axis 25 to the rigid member which interconnects axes 23 and 25, and this same member must also be hingably connected about axis 26 to the member which rigidly interconnects axes 24 and 26. Similarly, the end link members must be hingably connected to the input and output shafts about first hinge axes 23 and 24, respectively. The linkage system must be geometrically symmetrical about a plane which is the perpendicular bisector of a line between the geometric ends of the input and output shafts for 100 percent linearity of motion of the joint.

Also, second hinge axes in the linkage system must intersect at a point spaced from a line between the geometric ends of the input and output shafts if the joint is to have axial, torsional and shear stiffness. As a qualification to the foregoing, it is to be noted that, if the input and output shafts are supported so that they cannot move laterally, i.e., in a translatory manner, but can move only rotationally, then the second hinge axes in the linkage system may be parallel to each other. Where the second hinge axes of each linkage system intersect in the manner set forth above, however, the joint has sufficient shear stiffness to automatically prevent lateral movement of the shafts relative to each other.

Angles $\alpha$, $\beta$ and $\phi$ can have any values desired so long as the relations $(2\alpha+2\beta-\phi)>180+\gamma_0$ and $2\beta>\gamma_0$ are met, where $\gamma_0$ is the maximum angularity desired in the joint. It should be understood, however, that structural design of the elements of the linkage systems can produce mechanical interference of the elements in the joint at values of $\gamma$ less than $\gamma_0$.

Any number of linkage systems may be provided in a joint according to this invention; the greater the number of systems present, the smaller the value of angle $\gamma$ when mechanical interference first occurs. If one or two linkage systems are used, the input and output shafts should be mounted so that they cannot move laterally, i.e., in a translatory manner, relative to their axes; such a joint can be used in place of a bevel gear system between two non-aligned shafts. Each linkage system should itself meet the conditions set forth above, but between the systems the values of angles $\alpha$, $\beta$ and $\phi$ may vary so long as the distance between points B and C is held constant. Where the values of angles $\alpha$, $\beta$ and $\phi$ vary from system to system in a single joint, the lowest value of $\gamma_0$ obtained from the relation $(2\alpha+2\beta-\phi)>180+\gamma_0$ for each of the systems determines the value of $\gamma_0$ for the joint as a whole. Also, where plural linkage systems are provided in a joint, all hinge axes 23, 23', 23", . . . must intersect at a common point on the input shaft axis, and all hinge axes 24, 24', 24", . . . must intersect at a common point on the output shaft axis.

In any joint according to this invention, whether it be a joint using only a single linkage system or up to three or more systems, the central hinge axes in each system, or in any system, may be parallel to each other. If the joint is so constructed that less than three linkage systems have central hinge axes which intersect at points spaced from a line between the geometric ends of the input and output shafts, then the joint has no shear stiffness and the shafts must be mounted in a shear-stiff manner, i.e., be mounted so that they cannot move in a translatory manner. On the other hand, if the joint includes at least three linkage systems which have central hinge axes intersecting at points spaced from a line between the geometric ends of the shafts, as shown in the drawings, the joint has sufficient shear stiffness to automatically prevent lateral movement of the shafts and the joint also has axial and torsional stiffness.

Where a joint includes three or more linkage systems, at least three of the systems must have the first hinge axes thereof at each end of the joint disposed nonparallel to each other if the joint is to have inherent shear stiffness.

FIGS. 9 and 10 show another high angularity, constant velocity universal joint 110 according to this invention. Joint 110 presently is preferred over joint 10 because it is less expensive to manufacture and provides a slightly higher value of $\gamma_o$ (actual) than does joint 10.

In the illustration of joint 110, character numerals 100 higher than those used in the illustration and description of joint 10 have been employed so that the geometrical and physical similarities between these joints may be discerned readily and so that a detailed description of the geometry and structure of the joint becomes unnecessary. Therefore, an inspection of FIGS. 9 and 10 in conjunction with the foregoing description of FIGS. 1–5 will be understood to clearly present the detailed geometrical and structural features of joint 110. The geometric relationships set forth above regarding any joint according to this invention apply to joint 110.

In joint 110, input and output shafts 111 and 112 are axially bored at 163 and 164 to receive driving and driven units 165 and 166 which are secured to the joint by pins 167 and 168 passed through holes 169 and 170 formed diametrically through shafts 111 and 112, respectively.

Joint 110 illustrates a significant aspect of this invention when compared with joint 10. In joint 10, first axes 23, 23' and 23" are in angular alignment with axes 24, 24' and 24", respectively, when shafts 11 and 12 are coaxially aligned. In joint 110, however, axes 123, 123' and 123" are displaced angularly of axes 124, 124' and 124", respectively, about axes 121 and 122 when these shaft axes are coaxial; the extent of this displacement is 180° in joint 110. Nevertheless, linkage systems 118, 119 and 120 are jointly and severally symmetrical about plane 113, the plane of symmetry of the joint, since each linkage system defines identical values of angles $\alpha$ and $\beta$ at its opposite ends and angle $\phi$ of each system is bisected by plane 113. As in joint 10, the first axes of joint 110 are spaced symmetrically about and intersect their respective shaft axes at the geometric ends of the shafts. The above-cited differences between joints 10 and 110 are not in violation of the foregoing general criteria which must be observed in a universal joint according to this invention.

In a joint according to this invention having the geometric configuration shown in FIGS. 9 and 10, as opposed to the configuration shown in FIGS. 1–5 in which first axes 23 and 24, for example, are angularly aligned with each other about axes 21 and 22, a relation additional to those given above must be observed. Where the first axes of a linkage system are displaced relative to each other about the drive and driven shaft axes, angles $\alpha$ and $\beta$ must have values of 90° and the first axes of each linkage system must be disposed 180° apart from each other about the drive and driven shaft axes. That is, with respect to joint 110 for the purposes of illustration, the angles between axes 121 and 123, 123 and 125, 126 and 124, and 124 and 122 must all be 90°. Also, assuming that axes 121 and 122 are collinear and the joint is viewed along these axes (as in FIG. 9), linkage systems first hinge axes 123 and 124, for example, must be spaced 180° apart about axes 121 and 122. These same relations must exist for every linkage system in a joint having the geometrical configuration of a joint illustrated by joint 110.

As with joint 10, joint 110 can be provided with one or two linkage systems, or with more than three systems, if desired.

In the foregoing description, reference has been made to geometrical symmetry as well as structural symmetry. The universal joints illustrated in FIGS. 1–3, 9 and 10 have both geometrical and structural symmetry in that the link members which are hingably interconnected between the first and second hinge axes associated with the input shaft are identical to the link members hingably interconnected between the first and second hinge axes associated with the output shaft. Link members which are not identical in structural appearance may be used in a linkage system of a joint according to this invention so long as the geometric characteristics of the members are identical. In other words, the end link member, for example, to be used in linkage system 18 in connection with input shaft 11 may have a left-handed characteristic and the link member associated with the output shaft may have a right-handedness characteristic so long as both link members define identical values of angle $\beta$.

As noted above, however, the linkage systems in a plural system joint need not be either structurally or geometrically identical. Also, the linkage systems need not be symmetrically connected between the input and output shafts. That is, in the three-system joint described, for example, the angles between axes 23, 23' and 23", measured in a plane normal to input shaft axis 21, need not all be 120°, but the angular relation between the first hinge axes associated with the input shaft should be the same as the angular relation between the first hinge axes associated with the output shaft.

The joints illustrated in FIGS. 1–3, 9 and 10 and described above are preferred at present since they have shear stiffness which means that the input and output shafts are held from axial and lateral movement by the linkage systems. The joints have desirable dynamic properties because the linkage systems are structurally identical and are connected symmetrically between the input and output shafts. Also, the use of three linkage systems provides minimum mechanical interference in a joint having inherent shear stiffness.

While the invention has been described above with respect to specific geometrical arrangements and structural forms, such description has been presented merely as a vehicle for the explanation of the principles and necessary operative relations of a universal joint according to this invention. The conditions which must exist for an operative universal joint have been set forth with particularity. Accordingly, it will be understood that in all other respects the geometry and structure of the joint described may be varied without departing from the scope of this invention.

What is claimed is:

1. A very high angularity constant velocity universal joint comprising:
   (a) a drive shaft and a driven shaft each having an axis of rotation, an end adjacent the other shaft, and an imaginary reference point along the axis,
   (b) at least three linkage systems interconnecting the drive and driven shafts and connected symmetrically to each of said shafts, each linkage system comprising, in terms of the geometry thereof,
      (1) two first hinge axes each intersecting the axis of a corresponding shaft at said reference point and fixed relative to the corresponding shaft axis,
      (2) two central hinge axes each intersecting a corresponding first hinge axis at the corresponding reference point and intersecting each other at a point spaced from a line between said reference points in an imaginary plane, disposed midway between the reference points and normal to said line, about which the system is symmetrical, (3) three rigid links hingably connected one between each intersecting pair of hinge axes for defining and fixing the true angle of intersection of such pair or axes, and (c) means mounted to each of said shafts adjacent the end thereof for defining said linkage system first hinge axes.

2. A very high angularity constant velocity universal joint comprising:

(a) a drive shaft and a driven shaft each having an axis of rotation and an end adjacent the other shaft, and (b) at least three geometrically substantially identical linkage systems interconnecting the drive and driven shafts and connected symmetrically between the shafts, each linkage system comprising (1) axle means mounted to each shaft adjacent the end thereof for defining a first hinge axis fixed relative to and intersecting the shaft axis, the intersection of each first hinge axis with the corresponding shaft axis defining a reference point common to the other systems, (2) first rigid link means coupled to each first axle means for rotation about the corresponding first hinge axis and having associated therewith a second hinge axis intersecting the adjacent first hinge axis at the adjacent reference point, (3) secondary rigid link means coupled at respective ones of a pair of opposite ends thereof to respective ones of said first link means for rotation about the corresponding second hinge axes, (c) the linkage systems being geometrically symmetrical about a point midway between said reference points.

3. A universal joint according to claim 2 wherein the first and second link members are cooperatively configured so that the second hinge axes in each linkage system intersect at a point spaced outwardly of the link members from a line between the reference points.

4. A universal joint according to claim 2 wherein the axle means for each linkage system are mounted to the drive and driven shafts so as to be 180° out of phase with each other relative to the shaft axes.

5. A constant velocity universal joint for coupling together adjacent ends of rotatable drive and driven shafts, comprising:

(a) at least three linkage systems for interconnecting the drive and driven shafts and each defining and including (1) two end hinge axes disposed one at each of a pair of spaced ends of the system for intersecting a corresponding shaft axis at an imaginary reference point along the shaft axis common to the other systems, (2) two central hinge axes each intersecting a corresponding end hinge axis of the same system at the corresponding reference point at a predetermined angle and disposed in a predetermined relation to each other, and (3) three rigid links hingably connected one between each intersecting set of end and central hinge axes for defining the predetermined angle of intersection of such axes and one between the central hinge axes for maintaining said predetermined relation, (4) each system being symmetrical about a plane normal to and disposed midway along a line between said reference points, and (b) means at the opposite ends of the systems adapted for securing the systems between the shafts so that the end hinge axes of the systems are fixed angularly relative to the corresponding shaft axes.

6. A universal joint according to claim 5 wherein the end hinge axes are defined by the means adapted for securing the systems between the shafts.

7. A universal joint according to claim 5 wherein the central hinge axes of each system intersect each other in said plane.

8. A universal joint according to claim 7 wherein the points of intersection of the central hinge axes are spaced from a line between the reference points.

9. A universal joint according to claim 5 in which for each system the quantity $(2\alpha+2\beta-\phi)$ is greater than the sum of 180° and the maximum value in degrees of that angle between the shaft axes which has the value of 0° when the shafts are collinear, where $\alpha$ is the value in degrees of the angle between an end hinge axis and the corresponding shaft axis, $\beta$ is the value in degrees of the angle between an end hinge axis and the central hinge axis intersected therewith, and $\phi$ is the value in degrees of the angle between the central hinge axes, and the value of angle $\beta$ is greater than one-half the valve of said shaft axes angle.

10. A universal joint according to claim 9 wherein the values of angles $\alpha$, $\beta$ and $\phi$ are equal for all linkage systems.

11. A universal joint according to claim 10 wherein the means at the ends of the systems are arranged for securing the systems symmetrically between the shafts.

12. A universal joint according to claim 10 wherein each end hinge axis is substantially normal to the corresponding shaft axis, each predetermined angle is substantially a right angle, and the central hinge axes in each linkage system intersect each other at an included angle of substantially 55°.

References Cited

UNITED STATES PATENTS

| 96,395 | 11/1969 | Clemens | 64—19 |
|---|---|---|---|
| 125,880 | 4/1922 | Clemens | 64—21 |
| 3,075,368 | 1/1963 | Hulse | 64—21 X |

FOREIGN PATENTS 990,627  6/1951  France.

HALL C. COE, Primary Examiner

U.S. Cl. X.R.

64—19